United States Patent [19]

Harben, III

[11] Patent Number: 4,799,292
[45] Date of Patent: Jan. 24, 1989

[54] GIZZARD PEELING APPARATUS

[75] Inventor: Grover S. Harben, III, Gainesville, Ga.

[73] Assignee: Centennial Machine Company, Inc., Gainesville, Ga.

[21] Appl. No.: 173,191

[22] Filed: Mar. 25, 1988

[51] Int. Cl.⁴ ............................................. A22C 21/00
[52] U.S. Cl. .......................................... 17/11; 17/21
[58] Field of Search .............................. 17/11, 21, 50

[56] References Cited

U.S. PATENT DOCUMENTS 4,249,284  2/1981  Graham et al. ............. 17/11.1 R X
4,590,643  5/1986  Hill ................................... 17/11

Primary Examiner—Willie G. Abercrombie
Attorney, Agent, or Firm—Jones, Askew & Lunsford

[57] ABSTRACT

A gizzard peeling machine including at least one pair of toothed rolls for grasping and peeling the pocket lining from a gizzard, and having a tamper for periodically pressing the gizzard inwardly against the peeling rolls. Oscillation of the tamper occurs without connection to the peeling rolls, so that the rolls and the support bushings for the rolls are unaffected by movement of the tamper.

5 Claims, 2 Drawing Sheets

GIZZARD PEELING APPARATUS

FIELD OF INVENTION

This invention relates in general to poultry processing equipment, and relates in particular to apparatus for peeling the pocket lining from poultry gizzards.

BACKGROUND OF THE INVENTION

The edible portions of gizzards from chicken and other poultry carcasses are harvested in several steps. These steps in processing the gizzard include removing the viscera from the gizzard, after which the gizzard is split and opened for washing and removal of the pocket lining from the split gizzard.

Gizzard peeling machines usually employ a pair of peeling rolls mounted in side-by-side relation with each other. These peeling rolls have helical teeth along their lengths, with the teeth of the rolls being mutually spaced apart sufficiently to define an elongate space for receiving a gizzard placed on the rotating rolls. This space is too small to permit passage therethrough of the gizzard itself. The counter-rotating action of the toothed peeling rolls removes the pocket lining and draws that lining downwardly through the space until the peeled gizzard rests on the rolls. The gizzard thus becomes properly aligned along a longitudinal axis parallel to the rolls, and the helical teeth on the rotating rolls draws the gizzard longitudinally along that path. The gizzard then is removed from the peeler rolls for further processing.

Because the proper operation of such gizzard peeling apparatus requires a firm engagement of the gizzard with the toothed peeling rolls, some peeler machines use tampers which urge the gizzards inwardly toward the nip of the peeling rolls. These tampers preferably move back and forth relative to the longitudinal gizzard-receiving space defined by the nip between the rolls, the tampers thus alternately moving away from the rolls to accommodate incoming gizzards and moving toward the rolls to tamp those gizzards firmly against the helical teeth on the rotating rolls.

The preferred way of driving the tampers in prior-art peeler apparatus is to mechanically link the tamper to at least one of the rotating peeling rolls at the so-called free or undriven end of that roll. This seemed like a relatively inexpensive and effective way of utilizing the motion of the driven peeling rolls to operate the tamper. However, disadvantages to this driving arrangement have become evident. A principal disadvantage of the tamper drive arrangement in the prior art is that the mechanical load imparted to the peeling rolls damages the bushings of the rolls. This damage may arise from the nonuniform or periodic nature of the radial load imparted to the rotating rolls by driving the oscillating tamper into and out of tamping engagement with a gizzard on the rolls. The problem of damage to the support bushings of the peeling rolls has worsened as the preferred length of these rolls has increased for better performance. The rolls themselves are driven from the end opposite to the location of the tamper, so that a common drive mechanism coupled both to the tamper and the corresponding end of the drive rolls heretofore was considered not feasible without major redesign and reconstruction of the gizzard peeler apparatus.

SUMMARY OF THE INVENTION

The foregoing and other disadvantages associated with the prior art are overcome by the present invention, in which a tamper associated with at least one pair of peeling rolls is driven apart from the rolls themselves. The tamper moves back and forth on a path toward the gizzard receiving space between a pair of peeling rolls, and a separate drive imparts oscillating or reciprocating motion to the tamper. The rolls thus are not subjected to the intermittent or periodic loading heretofore encountered with roll-driven tampers of the prior art, whenever the tamper pressed against a gizzard on the rolls.

Stated somewhat more particularly, the tamper associated with the present invention is mounted for oscillating movement above a pair of laterally-aligned peeling rolls. A movable support holds the tamper for movement along a predetermined path relative to the rolls, and the position of the tamper may optionally be variable to insure proper alignment of the tamper. The drive mechanism for the tamper is directly connected to a drive motor, and in turn oscillates the tamper support on the path leading to contact with gizzards on the rolls. This drive mechanism preferably includes a shaft driven for rotation, and a tamper moving arm eccentrically attached to the shaft so as to convert rotary movement of the shaft into oscillating movement of the tamper.

Accordingly, it is an embodiment of the present invention to provide an improved gizzard peeler apparatus.

It is another object of the present invention to provide a gizzard peeler apparatus wherein the tamper is driven independently of the peeling rolls.

It is a further object of the present invention to provide a gizzard peeler apparatus in which the peeling rolls do not drive the tamper.

Other objects and advantages of the present invention will become more readily apparent from the following description of a preferred embodiment.

DESCRIPTION OF PREFERRED EMBODIMENT

Figure 1:
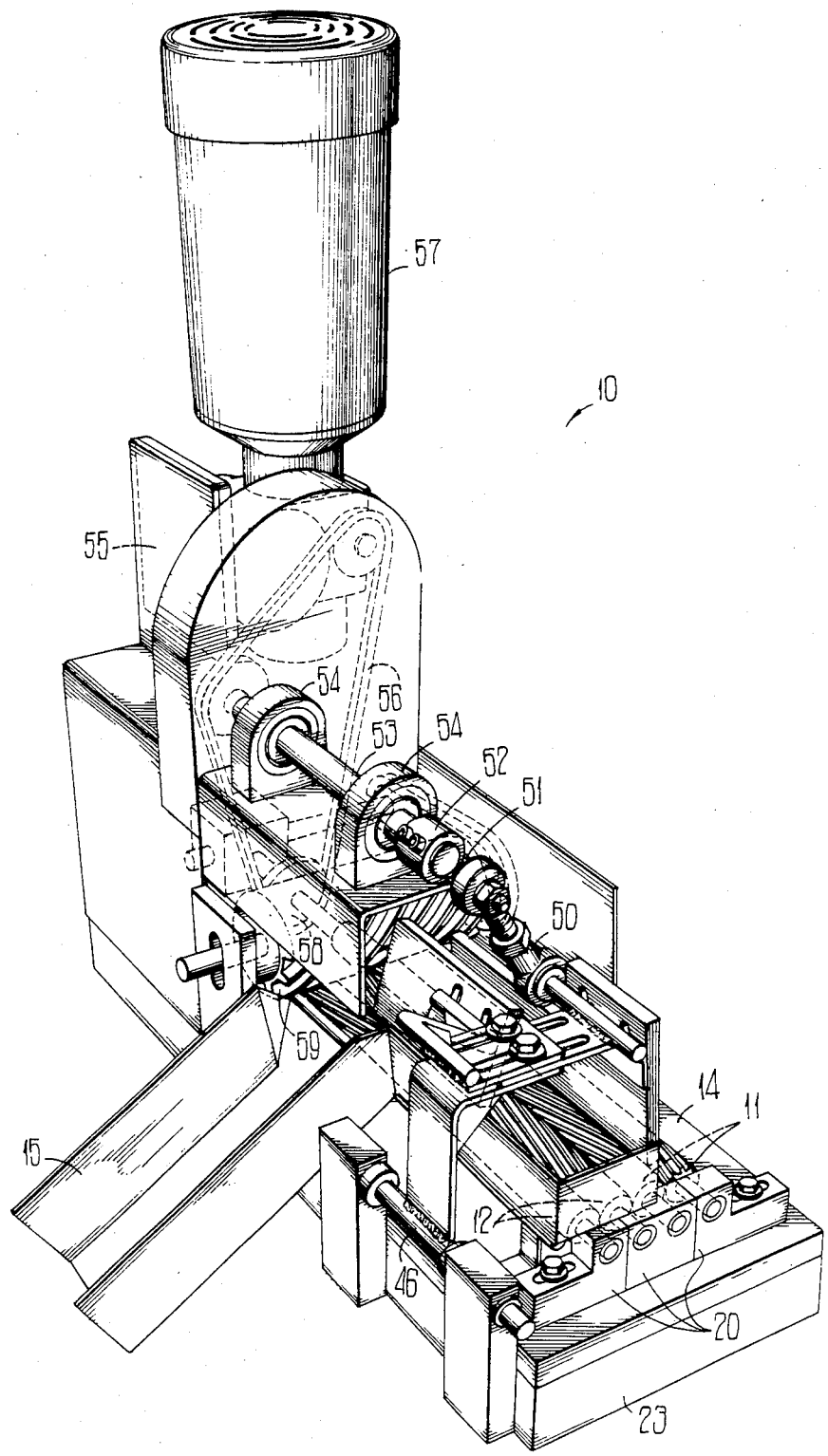
FIG. 1 is a pictorial view showing a gizzard peeling apparatus according to a preferred embodiment of the present invention.

A gizzard peeler apparatus embodying the present invention is indicated generally at 10 in FIG. 1. The gizzard peeler apparatus 10 includes a first pair of peeling rolls 11 and a second pair of such rolls 12 laterally alongside the first pair of rolls, although it should be understood that the present invention is as well applicable to gizzard peeler apparatus having only a single pair of peeling rolls. An infeed chute (not shown) is positioned at one end 14 of the paired viscera removal rolls 11 and 12, and this one end is hereafter known as the infeed end of the rolls. The infeed chute has a downward pitch leading to the viscera removal rolls, and thus comprises part of a conveyor for supplying gizzards to the peeler apparatus 10 from the gizzard splitting and opening machines, as is known to those skilled in the art. A gizzard removal trough 15 is located alongside the paired peeling rolls, longitudinally spaced from the infeed end 14 of the rolls. The gizzard removal chute 15 is pitched downwardly to convey gizzards away from the apparatus 10 after the pocket lining is removed, in the manner known to those skilled in the art.

The infeed end 14 of each peeling roll pair 11 and 12 is mounted in the bearing blocks 20, permitting free rotation of each roll. Each pair of viscera removal rolls 11 and 12 is powered from the end opposite the infeed end 14 in a manner known to those skilled in the art. The bearing blocks 20 mounting the infeed ends of each pair 11 and 12 of peeling rolls are adjustably mounted on the base 23 of the apparatus 10 so that the longitudinal axes of those rolls can be slightly divergent at the infeed end. This adjustability permits the nip between the peeling rolls of each pair 11 and 12 to decrease in width, as seen in the direction toward the discharge ends of the rolls. The peeling rolls of each pair 11, 12 may actually contact each other at the gizzard removal end remote from the infeed end 14, so that only one roll of each pair need be power-driven; the helical teeth of each driven roll thus engages the helical teeth on the mating paired roll, causing the rolls of each pair of counter-rotate at the same speed.

Figure 2:
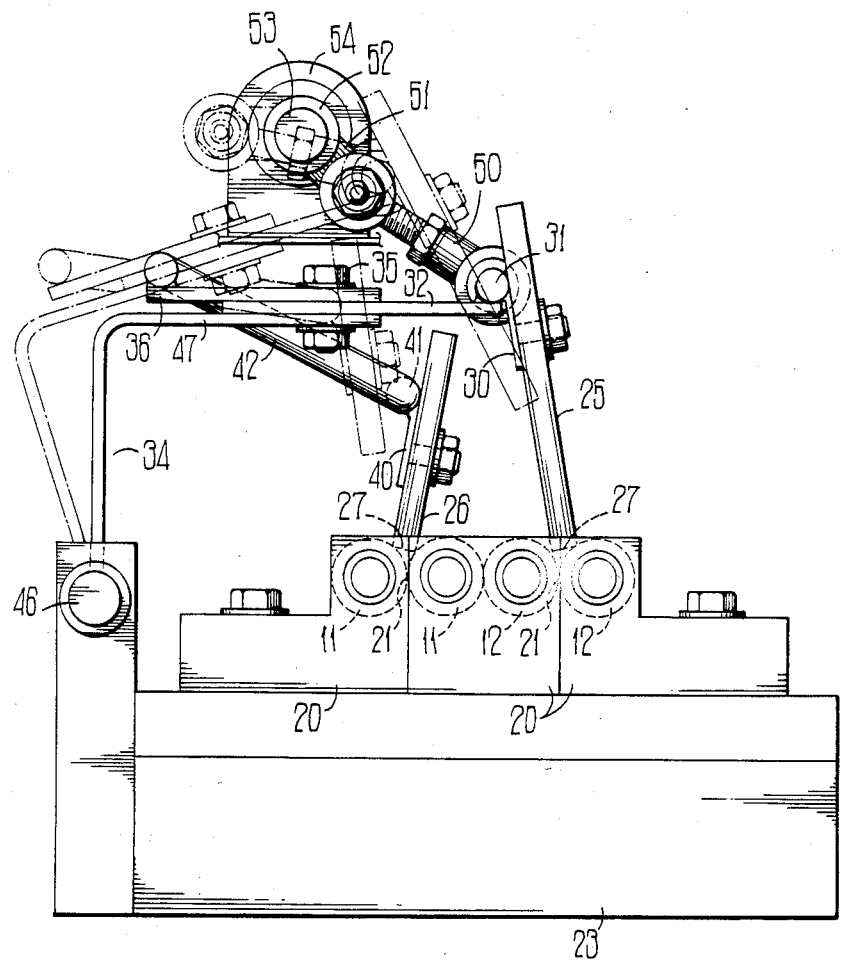
FIG. 2 is an end elevation view taken from the right side of FIG. 1.

A tamper 25 is positioned above the nip between the first pair of viscera removal rolls 11. Another tamper 26, best seen in FIG. 2, is positioned above the nip between the second pair of viscera removal rolls 12. The tampers 25 and 26 each comprise a flat sheet having a lower edge 27 parallel with the nip of the corresponding pair of peeling rolls, and vertically spaced in close proximity to the nip. Each tamper 25 and 26 preferably is fabricated from a relatively soft nonmetallic material such as nylon or the like, so that the steel toothed peeling rolls 10 and 11 are not damaged by inadvertent contact with a tamper.

A mounting bracket 30 is attached to the back side of the tamper 25 near the upper end of the tamper. Affixed to the upper edge of the mounting bracket 30 is an axle rod 31, which also is secured to the plate 32 extending outwardly from the back side of the tamper at approximately a horizontal attitude. One or more elongated adjustment apertures 33 are formed in the plate 32, and the plate is secured to the oscillating bracket 34 by bolts 35 or the like extending through the apertures in the plate 32 and through similar apertures in the second plate 36 stacked atop the first such plate.

The second tamper 26 also has a mounting bracket 40 attached near the upper end of the tamper. Secured to the mounting bracket 40 is one end 41 of a Z-shaped rod 42, whose other end 43 is secured to the second plate 36 mounted atop the oscillating bracket 34. The second plate 36 is slotted to permit adjusting the rod 42, and thus the lateral position of the tamper 26, relative to the nip between the second pair of peeling rolls 12. The tampers 25 and 26 thus are independently adjustable in the lateral direction relative to their corresponding rolls 11 and 12.

The oscillating bracket 34 is substantially L-shaped, with one leg of the oscillating bracket being substantially vertical and attached to the frame of the gizzard peeler apparatus 10 along a pivotable connection 46. The other leg 47 of the oscillating bracket 34 extends substantially horizontally in the direction of the first tamper 25, and provides a mounting surface on which the plates 32 and 36 are stacked and attached as previously described.

An adjustable connecting rod 50 is pivotably attached at one end of the axle rod 31 associated with the tamper 25. The other end of the connecting rod 50 is rotatably attached to the eccentric shaft 51 carried by the collar 52 secured to the tamper drive shaft 53. The tamper drive shaft 53, in turn, extends through a pair of ball bearing blocks 54 and engages a chain-driven sprocket 55. This sprocket engages the sprocket chain 56 driven by a motor 57 through a speed reducer, which also is coupled to the drive for the peeling rolls 11 and 12 in the disclosed embodiment, as schematically illustrated by the chain-driven sprocket 58 on the shaft extending to a peeler roll.

The operation of the apparatus should now be apparent. As gizzards with attached viscera arrive at the infeed end 14, these gizzards come to rest on the nip 21 between either the first or second pair of peeling rolls 11 and 12. The lateral width of each nip at the infeed end of each pair of peeling rolls is sufficiently narrow to accommodate the gizzards, and the helical teeth on the rolls peels the pocket lining from the gizzards in the manner known to the art. The gizzards, which were split and washed before arriving at the peeler apparatus 10, tend to become aligned with the longitudinal direction of the nip, and are drawn away from the infeed end of the rolls by the helical teeth.

While incoming gizzards thus become positioned on the peeling rolls, the tamper drive shaft 53 continuously rotates and imparts an oscillating motion to the connecting rod 50. This oscillating motion in turn causes the bracket 34 to oscillate about the pivotable connection 46, an action which alternately moves the tampers 25 and 26 toward and away from the respective nips between the peeling rolls 11 and 12. This oscillating movement of the tampers 25 and 26 periodically moves the lower edge 27 of each tamper blade downwardly and at close proximity with the nips, moving the lower edges into contact with a gizzard in the nip beneath a particular tamper. This contact between the tamper and a gizzard presses the gizzard firmly against the helical threads of the peeling rolls, thereby establishing a more positive engagement of the rolls with the lining on the gizzard and momentarily holding the gizzard in place while the rotating helical teeth on the rolls remove the pocket lining from the gizzard. The oscillating motion of the tampers periodically withdraws each tamper from the gizzards, so as not to unduly inhibit forward travel of the gizzards along the peeling rolls. A rotating gizzard removal roll 59 is transversely mounted above the peeling rolls 11 and 12 in line with the gizzard removal trough 15, and helical teeth on the gizzard removal roll displace the peeled gizzards from the peeling rolls and into the removal trough.

It should now be seen that each tamper 25 and 26 is driven apart from the rotating peeling rolls 11 and 12. This separate drive for the tampers is deemed to exist whether a common motor is coupled to drive both the tamper drive shaft 53 and the peeling rolls, or whether separate motors are provided for independent operation of the drive shaft and the viscera removal rolls. In either case, the free rotation of the peeling rolls 11 and 12 is unimpeded by any power-takeoff or similar linkage attached to the infeed end 14 of the rolls, as with the prior art, with the beneficial result that the bushings supporting those rolls at the infeed end are not subjected to the periodic or lateral loadings which can cause premature failure. The ball bearing blocks 54 for the tamper drive shaft 53 are designed to withstand the periodic load of the tampers, but those bearings are fewer in number than the bearings required for the peeling rolls.

It should also be apparent that the speed at which the tampers 25 and 26 oscillate is relatively easily varied independently of the speed at which the peeling rolls rotate. Likewise, the length of each tamper stroke is relatively easily adjustable independently of the peeler rolls. The present apparatus thus permits the operator to select the parameters of tamper operation which provide the best results, without interfering with the desired operating speed of the viscera removal rolls themselves.

It should be understood that the foregoing relates only to a preferred embodiment of the present invention, and that numerous changes and modifications therein may be made without departing from the spirit and scope of the invention as set forth in the following claims.

I claim:

1. Apparatus for removing the lining from a gizzard, comprising:
    a pair of laterally aligned peeling rolls defining an elongate gizzard receiving region between the rolls;
    means for counter-rotating the rolls from an end thereof;
    tamping means located alongside the gizzard receiving region and mounted for selective reciprocating movement toward the gizzard receiving region; and
    drive means operative independently from the rolls to reciprocate the tamping means toward and away from the gizzard receiving region, so that a gizzard disposed on the rolls is periodically urged into the gizzard receiving region without exerting a periodic load on the rolls.

2. Apparatus as in claim 1, wherein:
    the rolls each have a proximal end;
    at least some of the proximal ends operatively associated with the means for counter-rotating the rolls; the rolls each also having a distal end journaled for free rotation; and
    the drive means for the tamping means is operative independently from the distal ends of the rolls.

3. Apparatus as in claim 1, wherein:
    the drive means comprises a shaft;
    means for rotating the shaft;
    means for converting the rotation of the shaft to reciprocating motion; and
    means connecting the reciprocating motion to the tamping means.

4. Apparatus as in claim 1, wherein the tamping means comprises:
    a support member pivotably mounted in lateral spaced relation to the peeling rolls and having a portion located above the rolls;
    a tamping member attached to the support member portion and extending downwardly to a lower edge in proximate longitudinal alignment with the gizzard receiving region between the rolls; and the drive means comprises
    a shaft mounted for rotation in predetermined relation to the support member;
    an eccentric member operated by the shaft for converting rotation of the shaft to reciprocating motion; and
    means connecting the reciprocating motion to oscillate the support member about its pivotable mount, whereby the lower edge of the tamping member periodically oscillates toward and away from the gizzard receiving region between the rolls.

5. Apparatus as in claim 4, further comprising:
    a motor;
    drive means independently connecting the motor to at least one of the rolls and to the shaft.

* * * * *